(No Model.)
D. M. B. H. COCHRANE.
TRACTION DEVICE FOR VEHICLES.
No. 580,254. Patented Apr. 6, 1897.
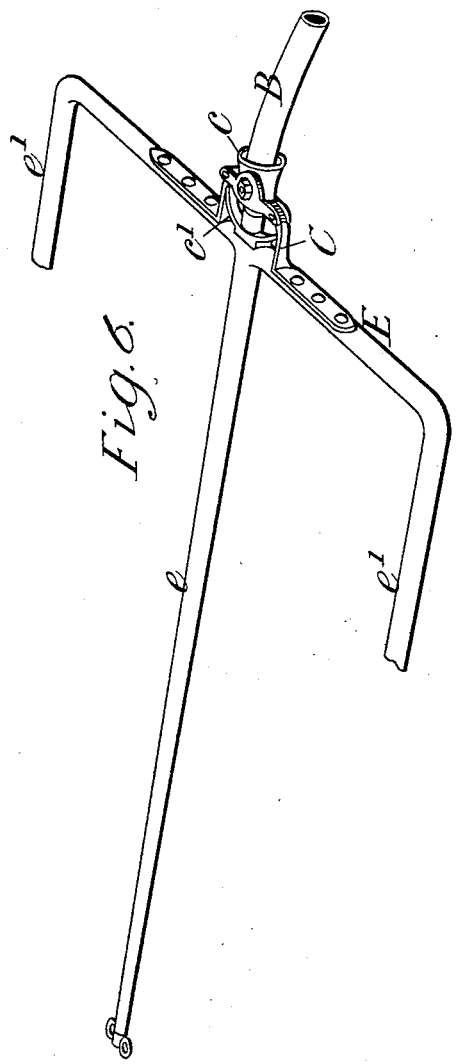

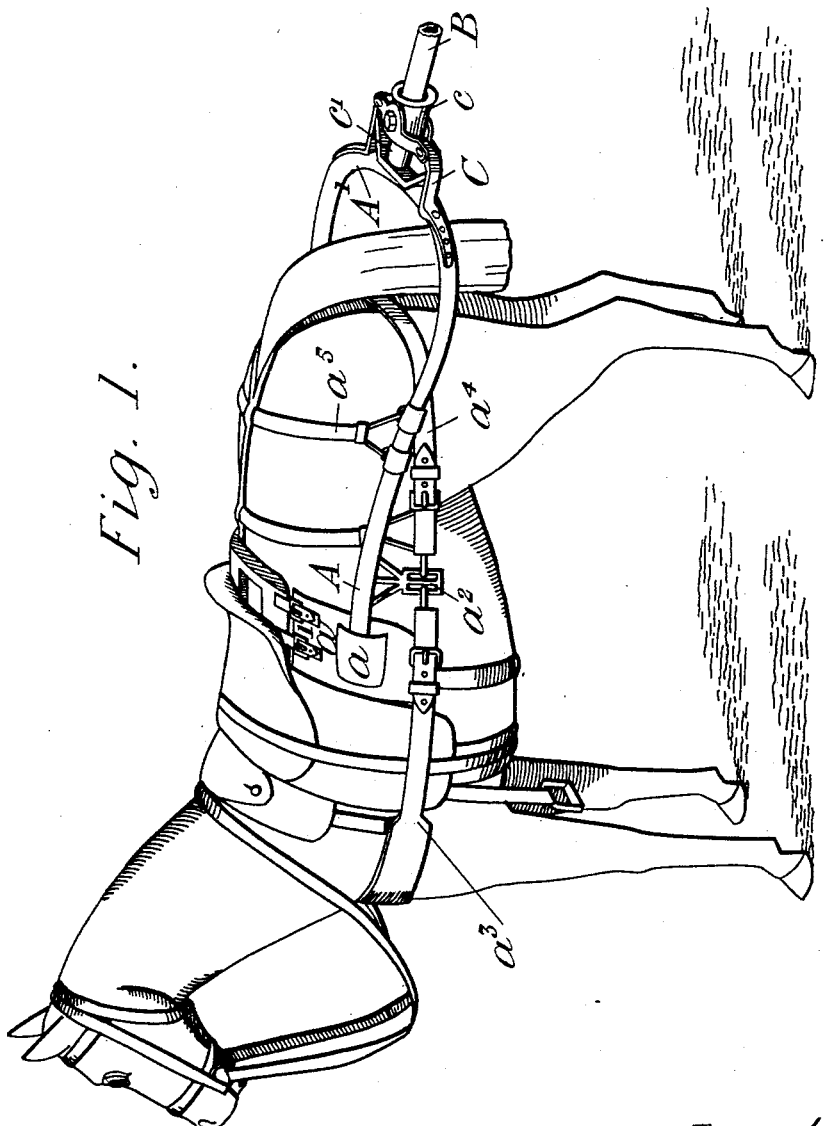

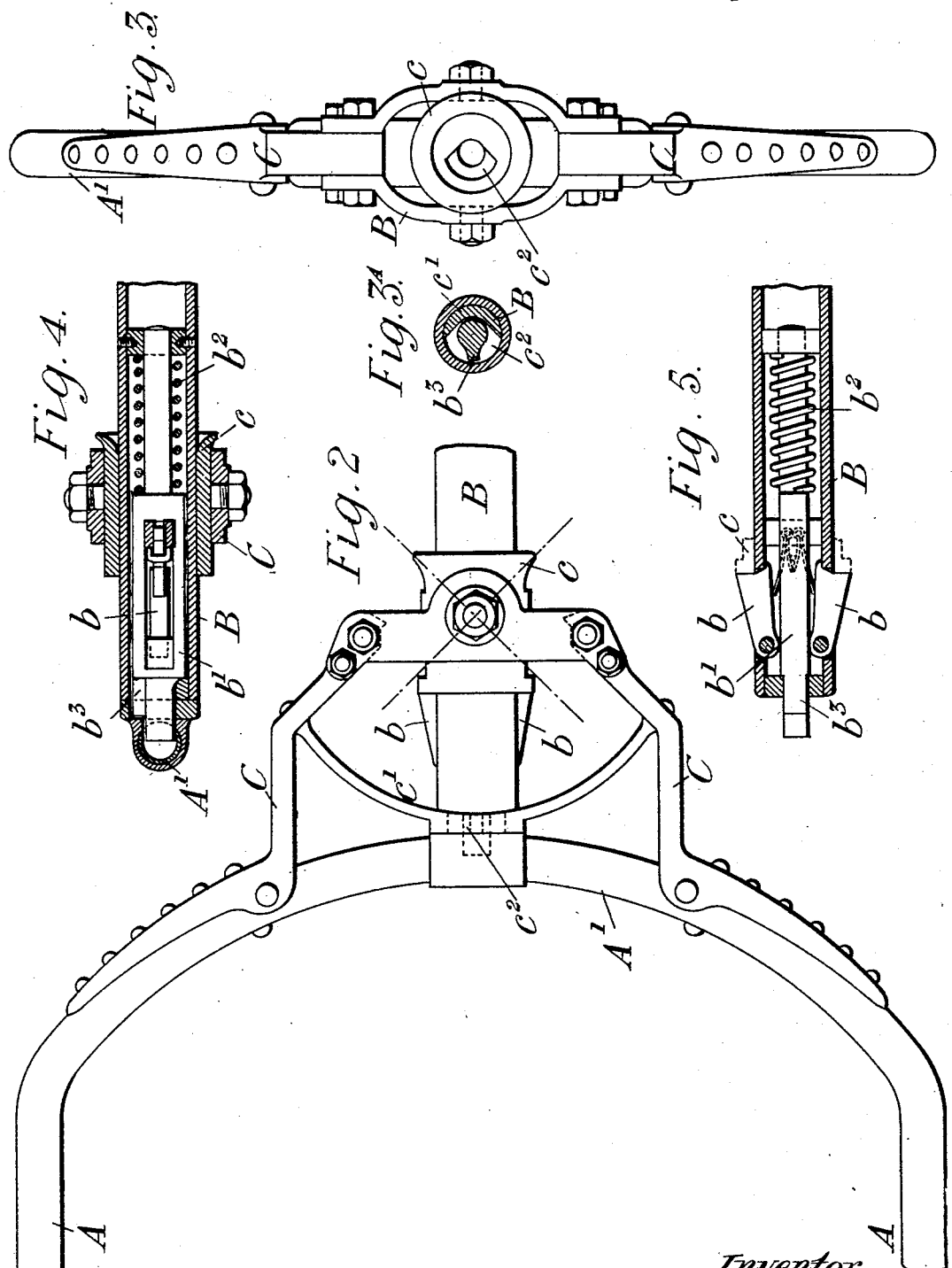

UNITED STATES PATENT OFFICE.

DOUGLAS MACKINNON BAILLIE HAMILTON COCHRANE, OF LONDON, ENGLAND.

TRACTION DEVICE FOR VEHICLES.

SPECIFICATION forming part of Letters Patent No. 580,254, dated April 6, 1897.

Application filed June 11, 1896. Serial No. 595,187. (No model.)

*To all whom it may concern:*

Be it known that I, DOUGLAS MACKINNON BAILLIE HAMILTON COCHRANE, Earl of Dundonald, a citizen of Scotland, residing at 34 Portman Square, London, England, have invented certain new and useful Improvements in Traction Arrangements for Vehicles, of which the following is a specification.

My invention relates to traction arrangements for vehicles, such that the horse or horses can be easily and rapidly attached to or detached from the vehicle, which may, for example, be a gun-carriage, an ambulance, a fire-engine, or other vehicle for which ready attachment and detachment are desirable, as I shall describe, referring to the accompanying drawings.

Figure 1 shows in perspective a horse carrying a pair of short shafts having means of attachment to an arm projecting from the front of the vehicle. Fig. 2 is a plan. Fig. 3 is a rear view; Fig. 3$^a$, a detail sectional view illustrating the manner in which the bolt $b'$ engages the arched guide $c'$; Fig. 4, a vertical longitudinal section, and Fig. 5 a horizontal longitudinal section, of the arm and its connection to the shafts. Fig. 6 is a perspective view showing the connection of the arm of the vehicle to a pole and pair of shafts arranged for two horses.

As shown in Fig. 1, the horse is harnessed and provided with a saddle for a rider. The shafts A are therefore made short, so as not to interfere with the rider's limbs, each shaft having its end held loosely in a pocket $a$, formed on an adjustable flap $a'$, attached to the saddle. The shaft is also freely connected at $a^2$ to straps $a^3$ and $a^4$, extending, respectively, round the breast and the hind quarters of the horse. The shafts are preferably made of steel tube bent to U form, and they are carried by the pockets $a$ and suitable straps $a^5$. When there is no rider, the shafts may extend forward and be supported from the saddle in the usual way, being attached by traces either to the breast-band $a^3$ or to a collar. In any case the shafts are supported at such a height that a socket provided on their rear bend A$'$ can be entered by an arm B, which projects from the front of the vehicle.

Referring now to Figs. 2 to 6, inclusive, on the bend A$'$ of the shafts A, I fix a bracket C, within an eye of which is pivoted, so as to lie free to turn horizontally, a trumpet-mouthed socket-piece $c$. Within the bracket C there is an arch-guide $c'$, concentric with the pivot of the socket-piece $c$, and in the center of the arch $c'$ there is a hole $c^2$ of a segmental form, its lower part coinciding with a round hole in the middle of the shaft bend A$'$. The arm B is tubular and has lateral slots, in each of which is pivoted a pawl $b$. The pawls are urged outward by springs as far as permitted by stops on the pawls. There is also within the arm B a bolt $b'$, which is slotted to admit the pawls and their springs and is urged forward by a helical spring $b^2$. The front part of the bolt is round to enter the hole in A$'$, and immediately behind this round part is a projection $b^3$, which, as shown in Fig. 3$^a$, can move partly around within the segmental hole $c^2$. For attaching the vehicle to the shafts the end of the arm B is inserted in the socket-piece $c$, which, being pivoted, can present itself to receive the arm as it is inserted even when the arm B is at a considerable obliquity to the center line of the shafts.

As the arm B is inserted the pawls $b$ are pressed inward until they have cleared the socket-piece $c$, when the arm is so far inserted that they spring out and hold it. The end of the bolt $b'$, if it does not happen to be in line with the center of the shaft bend A$'$, comes against the arch $c'$ and is pressed inward until, on the traction bringing it into line with the center line of the shafts, the end of the bolt $b'$ enters the hole $c^2$ and the farther hole in A$'$. As the projection $b^3$ can move to and fro within the segmental hole $c^2$ the vehicle is permitted to rock to a certain extent laterally. In order to detach the shafts from the vehicle, the pawls $b$ are pushed in by hand, the shafts being thus released.

As shown in Fig. 6, the bracket C, to which the arm B is connected, as above described, is fixed on a splinter-bar E, from which project forward a pole $e$ between a pair of horses and shafts $e'$ outside the horses.

Having thus described the nature of my invention and the best means I know for carrying the same into practical effect, I claim—

1. The combination with shafts carrying a bracket and a socket-piece pivoted on said bracket, of an arm detachably secured in said socket-piece and adapted to be connected to a vehicle, substantially as described.

2. The combination with shafts carrying a bracket and a socket-piece pivoted on said bracket, of an arm detachably journaled in said socket-piece and adapted to be connected to a vehicle, substantially as described.

3. The combination with shafts carrying a bracket and a socket-piece pivoted on said bracket, of an arm detachably journaled in said socket-piece and adapted to be connected to a vehicle, and means for locking the end of said arm to the bracket to prevent the movement of the socket-piece, substantially as described.

4. The combination with shafts carrying a bracket C and a socket-piece c pivoted on said bracket, of a tubular arm B arranged to engage said socket-piece, pawls b pivoted within the end of said arm and adapted to project through slots in said arm to engage the rear end of said socket-piece, and a spring for projecting said pawls, substantially as described.

5. The combination with shafts carrying a bracket C and a socket-piece c pivoted on said bracket, of an arm detachably secured in said socket-piece and provided at its end with a projecting tenon arranged to engage an aperture formed centrally in the shafts to lock the socket-piece against pivotal movement, substantially as described.

6. The combination with shafts having a circular aperture formed therein, of a bracket C fixed on said shafts, a socket-piece pivoted on said bracket, an arc-shaped guide c' fixed to the bracket in front of the socket-piece and having a central segment-shaped aperture in alinement with the aperture in the shafts, a tubular arm detachably journaled in said socket-piece, a tenon projecting through the forward end of the arm and provided with a spline near its end, and a spring for projecting the tenon into the said apertures, substantially as described.

7. The combination with shafts carrying a bracket C and a socket-piece c pivoted on said bracket, of a tubular arm B arranged to engage said socket-piece, pawls b pivoted within the end of said arm and adapted to project through slots in said arm to engage the rear end of said socket-piece, a spring for projecting said pawls outwardly, and stops for limiting the outward movement of the pawls, substantially as described.

In testimony whereof I have signed my name to this specification, in the presence of two subscribing witnesses, this 23d day of May, A. D. 1896.

DOUGLAS MACKINNON BAILLIE
HAMILTON COCHRANE.

Witnesses:
OLIVER IMRAY,
JNO. P. M. MILLARD.